(12) United States Patent
Rubin

(10) Patent No.: US 10,598,790 B2
(45) Date of Patent: Mar. 24, 2020

(54) MODULAR LIGHT DETECTION AND RANGING DEVICE OF A VEHICULAR NAVIGATION SYSTEM

(71) Applicant: Essential Products, Inc., Palo Alto, CA (US)

(72) Inventor: Andrew E. Rubin, Los Altos, CA (US)

(73) Assignee: ESSENTIAL PRODUCTS, INC., Palo Alto, CA (US)

( * ) Notice: Subject to any disclaimer, the term of this patent is extended or adjusted under 35 U.S.C. 154(b) by 20 days.

(21) Appl. No.: 15/898,483

(22) Filed: Feb. 17, 2018

(65) Prior Publication Data
US 2018/0239023 A1     Aug. 23, 2018

Related U.S. Application Data

(60) Provisional application No. 62/460,675, filed on Feb. 17, 2017.

(51) Int. Cl.
*G01S 17/93* (2020.01)
*H02J 50/10* (2016.01)
(Continued)

(52) U.S. Cl.
CPC ............ *G01S 17/936* (2013.01); *G01S 7/003* (2013.01); *G01S 7/481* (2013.01); *G01S 17/08* (2013.01);
(Continued)

(58) Field of Classification Search
CPC ........ G01S 7/003; G01S 17/936; G01S 7/481; G01S 17/08; G01S 17/89; G01S 2013/9392; H02J 50/10; H02J 157/003; G05D 1/0289
See application file for complete search history.

(56) References Cited

U.S. PATENT DOCUMENTS

| | | | |
|---|---|---|---|
| 2009/0174774 A1* | 7/2009 | Kinsley | B60R 1/00 348/148 |
| 2010/0030473 A1 | 2/2010 | Au et al. | |

(Continued)

OTHER PUBLICATIONS

International Search Report and Written Opinion dated May 9, 2018 for PCT Application No. PCT/US18/18545 of Essential Products, Inc.

(Continued)

*Primary Examiner* — Jamil Ahmed
(74) *Attorney, Agent, or Firm* — Perkins Coie LLP

(57) ABSTRACT

The disclosed embodiments include a light detection and ranging (LIDAR) system. The LIDAR system includes a modular LIDAR device, which includes a scanner component and a structurally separate base component. The scanner component is mountable on an external surface of a vehicle, and includes a light source and detector to capture LIDAR data including a measure of a distance to an object relative to the vehicle. The scanner component also includes a communications transmitter to transmit LIDAR data indicative of the distance, and a power receiver to wirelessly power the scanner component. The base component is at least partially mountable on an interior surface of the vehicle, and includes a power transmitter to wirelessly power the scanner component, a communications receiver to wirelessly receive the LIDAR data, and a processor to enable autonomous or semi-autonomous navigation of the vehicle based on processed LIDAR data.

25 Claims, 7 Drawing Sheets

(51) Int. Cl.
  *G05D 1/02* (2020.01)
  *G01S 17/89* (2020.01)
  *G01S 17/08* (2006.01)
  *G01S 7/481* (2006.01)
  *G01S 7/00* (2006.01)
  *G01S 13/93* (2020.01)

(52) U.S. Cl.
  CPC ............ *G01S 17/89* (2013.01); *G05D 1/0289* (2013.01); *H02J 50/10* (2016.02); *G01S 2013/9392* (2013.01)

(56) References Cited

U.S. PATENT DOCUMENTS

| | | | | |
|---|---|---|---|---|
| 2011/0230178 A1* | 9/2011 | Jones | ................ | H04M 1/0235 455/422.1 |
| 2013/0313388 A1* | 11/2013 | Diatzikis | ................ | F16B 47/00 248/205.6 |
| 2015/0091374 A1* | 4/2015 | Lenius | ................ | H02J 17/00 307/9.1 |

OTHER PUBLICATIONS

"Light Detection and Ranging (LiDAR)", Portland State University; retrieved online on Apr. 13, 2018 from url: http://web.pdx.edu/~jduh/courses/geog493f12/Week04.pdf, Dec. 14, 2015, pp. 1-38.

\* cited by examiner

MODULAR LIGHT DETECTION AND RANGING DEVICE OF A VEHICULAR NAVIGATION SYSTEM

CROSS-REFERENCE TO RELATED APPLICATION

This application claims priority to U.S. Provisional Patent Application No. 62/460,675 filed on Feb. 17, 2017, entitled "WINDSHIELD MOUNTED VEHICULAR LIDAR," which is hereby incorporated by reference in its entirety.

TECHNICAL FIELD

The disclosed teachings relate to vehicular light detection and ranging (LIDAR) systems. More specifically, the disclosed teachings relate to a LIDAR system including one or more modular LIDAR devices mountable on a vehicle to enable semi-autonomous or autonomous navigation of the vehicle.

BACKGROUND

A semi-autonomous vehicle (i.e., driver-assisted) can assume certain tasks of driving that are otherwise performed by a human driver. An autonomous vehicle (i.e., driverless, self-driving, robotic) is a vehicle that is capable of sensing its environment and navigating without assistance from a human driver. Existing semi-autonomous or autonomous vehicle technology relies on a spinning range-finding unit such as a light detection and ranging (LIDAR) device mounted on the roof of the vehicle. FIG. 1 illustrates a conventional LIDAR device that sits atop the roof of an autonomous vehicle. A conventional LIDAR device has 64 lasers and receivers. In operation, the LIDAR device scans its surroundings and creates a detailed map of the vehicle's environment as the vehicle moves in the environment.

Specifically, LIDAR is a surveying method that measures a distance to an object by illuminating that object with a light. A LIDAR device can use laser, ultraviolet, visible, or near-infrared light to image objects. It can target a wide range of materials, including non-metallic objects, rocks, rain, chemical compounds, aerosols, clouds, and even single molecules. A narrow laser-beam can map physical features with very high resolutions. For example, an aircraft can map terrain at 30-centimetre (12 inch) resolution or better.

A autonomous navigation system includes software that employs information obtained from a LIDAR device to generate a map and compare it with a known or existing map. For example, FIG. 2 illustrates a map of a vehicle's environment generated by an autonomous navigation system based on LIDAR signals obtained by scanning an environment with a LIDAR device. As such, the autonomous navigation system can adapt to any differences from the known map and the generated map to navigate the vehicle. Unfortunately, existing LIDAR systems lack broad consumer appeal because conventional LIDAR devices are awkward and bulky, and retrofitting existing vehicles for such devices is cost-prohibitive.

SUMMARY

The disclosed embodiments include a vehicular light detection and ranging (LIDAR) system. The LIDAR system includes a modular LIDAR device, which includes a scanner component and a structurally separate base component. The scanner component is mountable on an external surface of a vehicle, and includes a light source and detector to capture LIDAR data including data indicative of a distance to an object relative to the vehicle. The scanner component also includes a communications transmitter to transmit LIDAR data indicative of the distance, and a power receiver to wirelessly power the scanner component. The base component is at least partially mountable on an interior surface of the vehicle, and includes a power transmitter to wirelessly power the scanner component, a communications receiver to wirelessly receive the LIDAR data, and a processor to enable autonomous or semi-autonomous navigation of the vehicle based on processed LIDAR data.

Embodiments also include a vehicular LIDAR system with multiple modular LIDAR devices and a central management component. Each modular LIDAR device includes a scanner component mountable on an exterior surface of a vehicle and operable to capture LIDAR data indicative of objects in a surrounding environment relative to the vehicle, and a base component operable to wirelessly supply power to the scanner component and wirelessly receive information indicative of the captured LIDAR data. The central management component is operable to control the modular LIDAR devices and process information indicative of LIDAR data captured by the modular LIDAR devices to enable autonomous or semi-autonomous navigation of the vehicle.

Embodiments also include a computer-implemented method performed by a modular LIDAR device. The method includes establishing a wireless communication channel for the modular LIDAR device between a scanner component mounted on an external side of a windshield of a vehicle and a base component located in an interior cabin of the vehicle, and establishing a wireless power connection between the scanner component and the base component through the windshield. The method further includes capturing LIDAR data indicative of a distance to an object relative to the vehicle, where the LIDAR data is obtained with the scanner component by emitting a light towards the object, and receiving at least a portion of the light reflected off the object. The method further includes wirelessly communicating information indicative of the LIDAR data from the scanner component to the base component through the windshield over the established wireless communication channel, and processing the information indicative of the LIDAR data to enable semi-autonomous or autonomous navigation the vehicle.

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter. Other aspects of the disclosed embodiments will be apparent from the accompanying Figures and Detailed Description.

BRIEF DESCRIPTION OF THE DRAWINGS

The techniques introduced here may be better understood by referring to the following Detailed Description in conjunction with the accompanying drawings, in which like reference numerals indicate identical or functionally similar elements.

DETAILED DESCRIPTION

Figure 1:
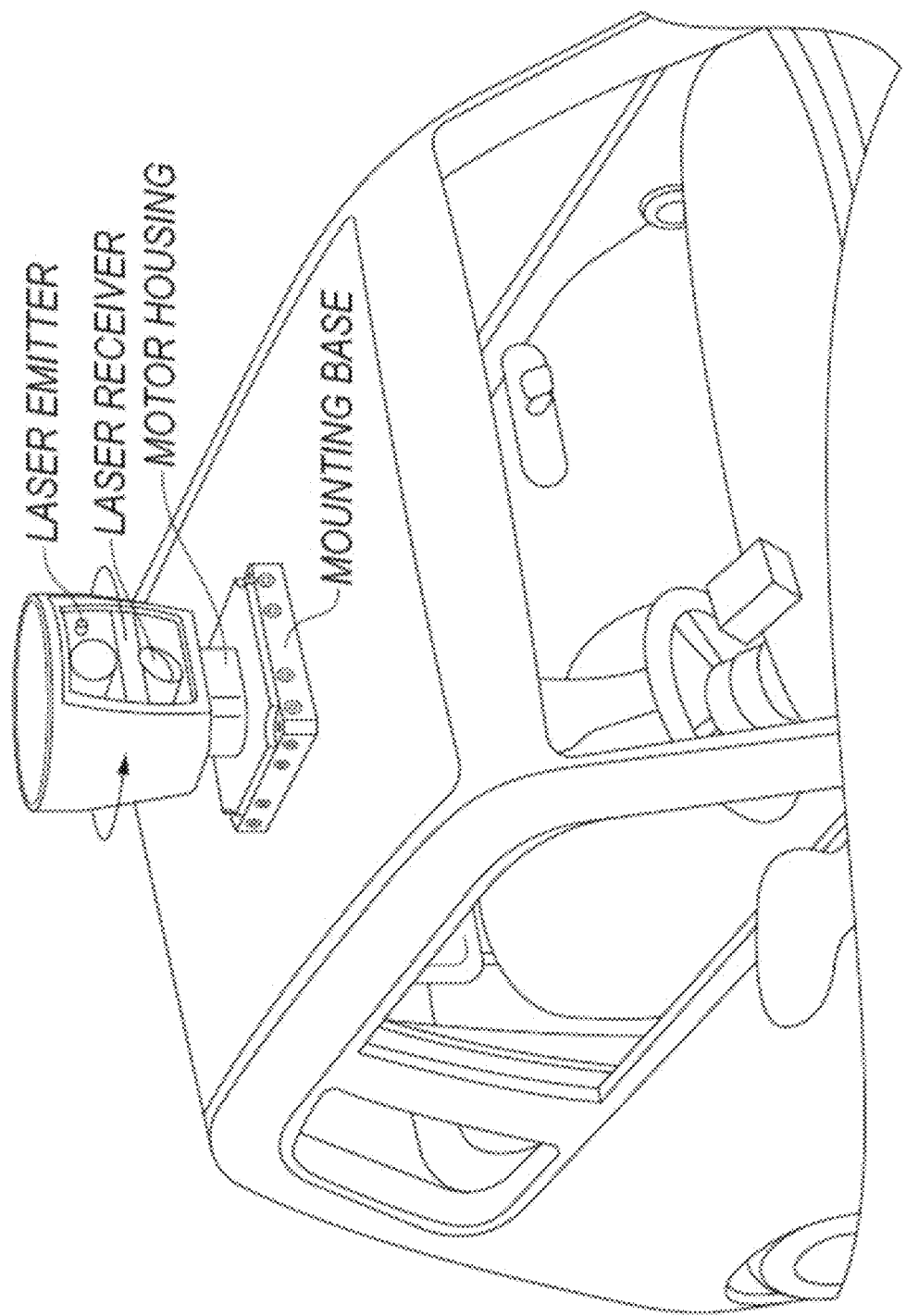
FIG. 1 is an illustration that depicts a light detection and ranging (LIDAR) device mounted on the roof of a vehicle.

The embodiments set forth below represent the necessary information to enable those skilled in the art to practice the embodiments and illustrate the best mode of practicing the embodiments. Upon reading the following description in light of the accompanying figures, those skilled in the art will understand the concepts of the disclosure and will recognize applications of these concepts that are not particularly addressed herein. It should be understood that these concepts and applications fall within the scope of the disclosure and the accompanying claims.

The purpose of the terminology used herein is only for describing embodiments and is not intended to limit the scope of the disclosure. Where context permits, words using the singular or plural form may also include the plural or singular form, respectively.

As used herein, unless specifically stated otherwise, terms such as "processing," "computing," "calculating," "determining," "displaying," "generating," or the like, refer to actions and processes of a computer or similar electronic computing device that manipulates and transforms data represented as physical (electronic) quantities within the computer's memory or registers into other data similarly represented as physical quantities within the computer's memory, registers, or other such storage medium, transmission, or display devices.

As used herein, terms such as "connected," "coupled," or the like, refer to any connection or coupling, either direct or indirect, between two or more elements. The coupling or connection between the elements can be physical, logical, or a combination thereof.

There are several components to a LIDAR system, including one or more laser light emitting devices. For example, a LIDAR system for non-scientific applications may have lasers that emit light of 600-1000 nm wavelengths. These types of lasers are inexpensive but can be easily focused and absorbed by a human eye. Accordingly, the maximum power output by these lasers should be limited to make them safe for human eyes. As such, eye-safety is often a requirement for most LIDAR applications. A common alternative is a 1550 nm laser, which is eye-safe at much higher power levels because this wavelength is not focused by human eyes. However, the light detector technology of a LIDAR system is less advanced and, as such, these wavelengths are generally used at longer ranges and for lower accuracies.

A LIDAR system may include user-programmable laser settings for a particular laser repetition rate, which can control data collection speed. Another setting is pulse length, which is generally an attribute of the laser cavity length, the number of passes required through the gain material (e.g., YAG, YLF) and Q-switch speed. Further, an improved target resolution is achieved with shorter light emission pulses, provided the LIDAR receivers/detectors and related electronics have sufficient bandwidth.

A LIDAR system also includes scanner and optical components, which determine how fast images can be developed as a function of the speed at which images are scanned. There are several options to scan an azimuth and elevation of a scene or environment including dual oscillating plane mirrors, a combination with a polygon mirror, and a dual axis scanner. The selection of a particular optical element can affect the angular resolution and range that can be detected by the LIDAR system. In some instances, a hole mirror or a beam splitter are options that can be employed to collect a return signal.

A LIDAR system also includes a photodetector and receiver electronics. For example, two photodetector technologies used in LIDAR systems include solid state photodetectors, such as silicon avalanche photodiodes, and/or photomultipliers. The sensitivity of a receiver is another parameter that should be balanced in a LIDAR system design.

A LIDAR system also includes position and navigation systems. In particular, LIDAR sensors that are mounted on mobile platforms require instrumentation to determine the absolute position and orientation of the sensor. Such devices generally include a global positioning system (GPS) receiver and an inertial measurement unit (IMU) to determine position or orientation.

A conventional roof-mounted LIDAR device requires an unimpeded path for a laser, from a light source to a target object and then back to the sensor (e.g., detector) near the source. Thus, a conventional roof-mounted LIDAR device is not suited for dash-mounted vehicular applications because a laser beam would need to pass through, and be subject to distortion imparted by, the windshield glass on its outward path from the laser to the target object and again on its return path from the target object to the sensor. As such, it was not previously practical to retrofit a vehicle for LIDAR directed autonomous or semi-autonomous operation without significant and cost-prohibitive modification of the vehicle.

The disclosed embodiments overcome these drawbacks with a surface-mounted modular LIDAR device. The embodiments make it possible to enable virtually any vehicle for LIDAR directed autonomous or semi-autonomous operation without needing to substantially retrofit the vehicle. In particular, the disclosed embodiments provide a bifurcated LIDAR assembly of a modular LIDAR device with a scanner component that can be readily mounted on any exterior surface of a vehicle. For example, the scanner component of a modular LIDAR device can be mounted on an exterior surface of a windshield of a vehicle. The disclosed embodiments also include a LIDAR system with multiple modular LIDAR devices that can be positioned on one or more surfaces of a vehicle to increase the amount of LIDAR data captured by the LIDAR system of a vehicle's environment to enable semi-autonomous or autonomous navigation of the vehicle.

Figure 2:
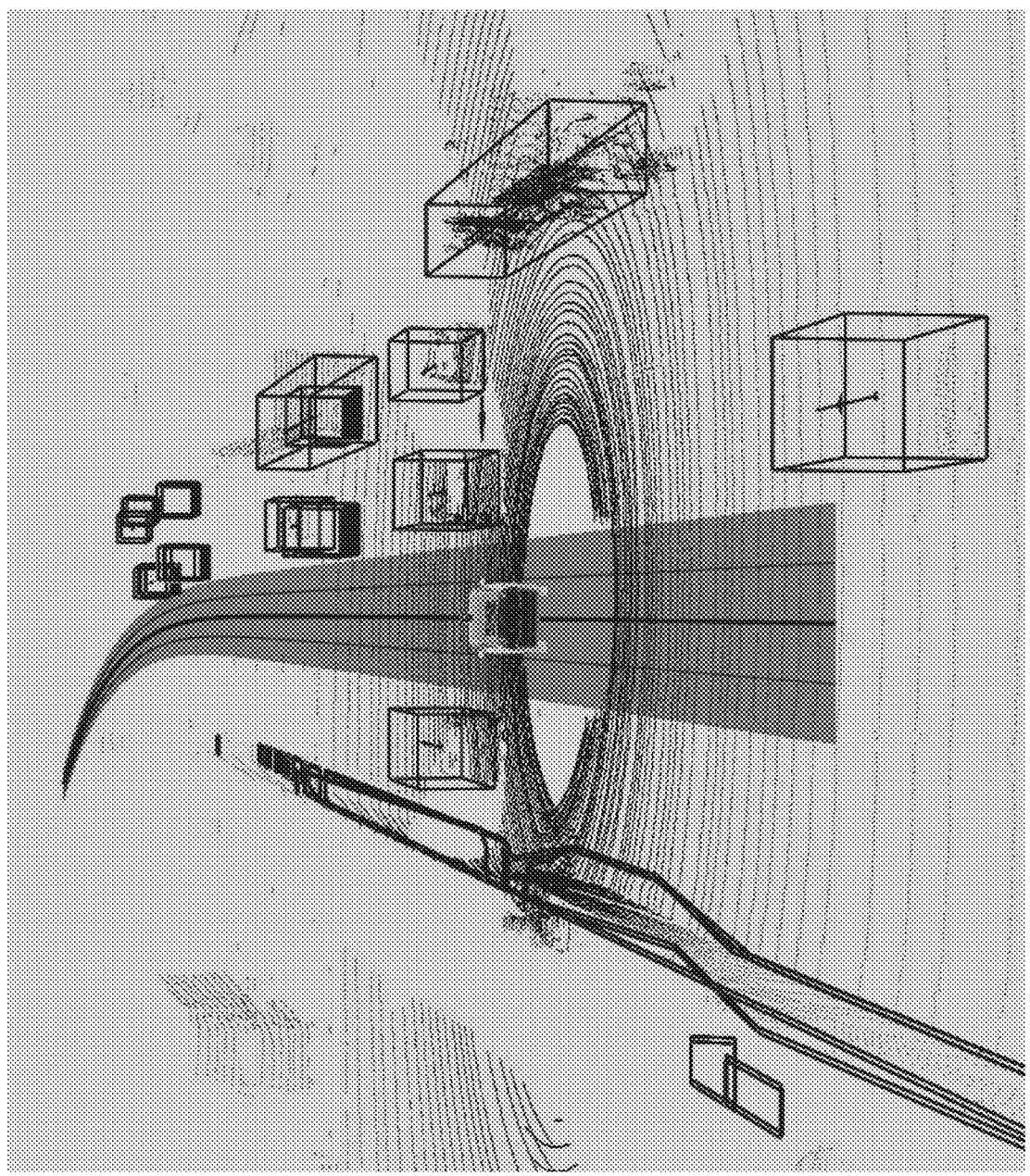
FIG. 2 illustrates an example of image created by a LIDAR system based on data captured by the LIDAR system to enable semi-autonomous or autonomous navigation of a vehicle.
Figure 3:
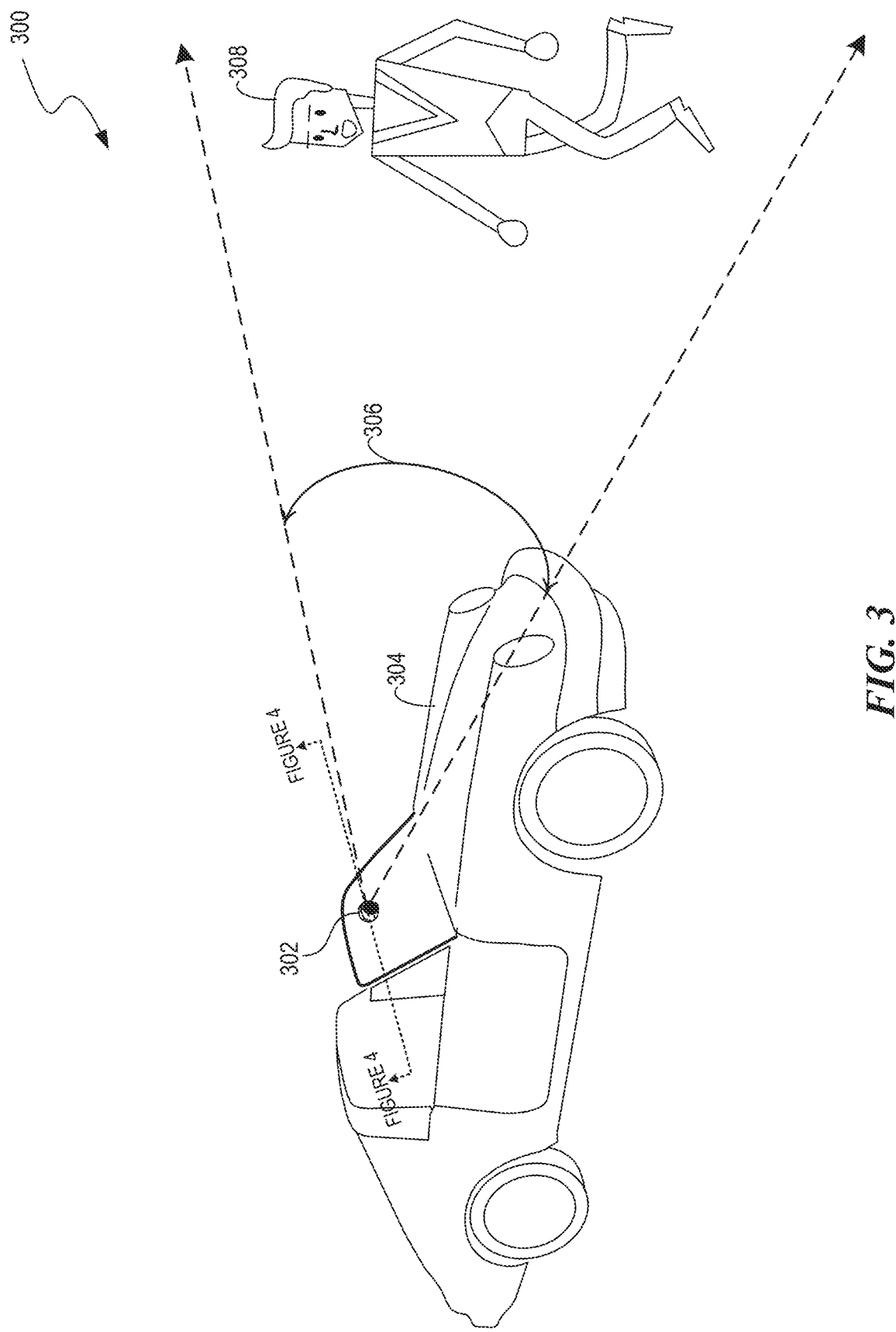
FIG. 3 illustrates a vehicle with a modular LIDAR device mounted on a windshield of the vehicle.

FIG. 3 illustrates a schematic of a 360-degree environment 300 including a modular LIDAR device 302 of a LIDAR system mounted on the front surface of a windshield of a vehicle 304. The modular LIDAR device 302 can scan a range 306 of a scene or environment that encompasses objects in front of the vehicle. The modular LIDAR device 302 can construct an image of a portion of the environment 300 in real-time to enable semi-autonomous or autonomous navigation of the vehicle. The generated image (e.g., such as that shown in FIG. 2) can automatically aid a driver of the vehicle 304. For example, the modular LIDAR device 302 can be part of a driver-assisted system. As shown, the modular LIDAR device 302 has within its scannable range 306 a person 308 walking in front of the vehicle 304. The driver-assisted system can use the LIDAR data obtained from the modular LIDAR device 302 to, for example, cause the vehicle 304 to avoid striking the person 308.

Figure 4:
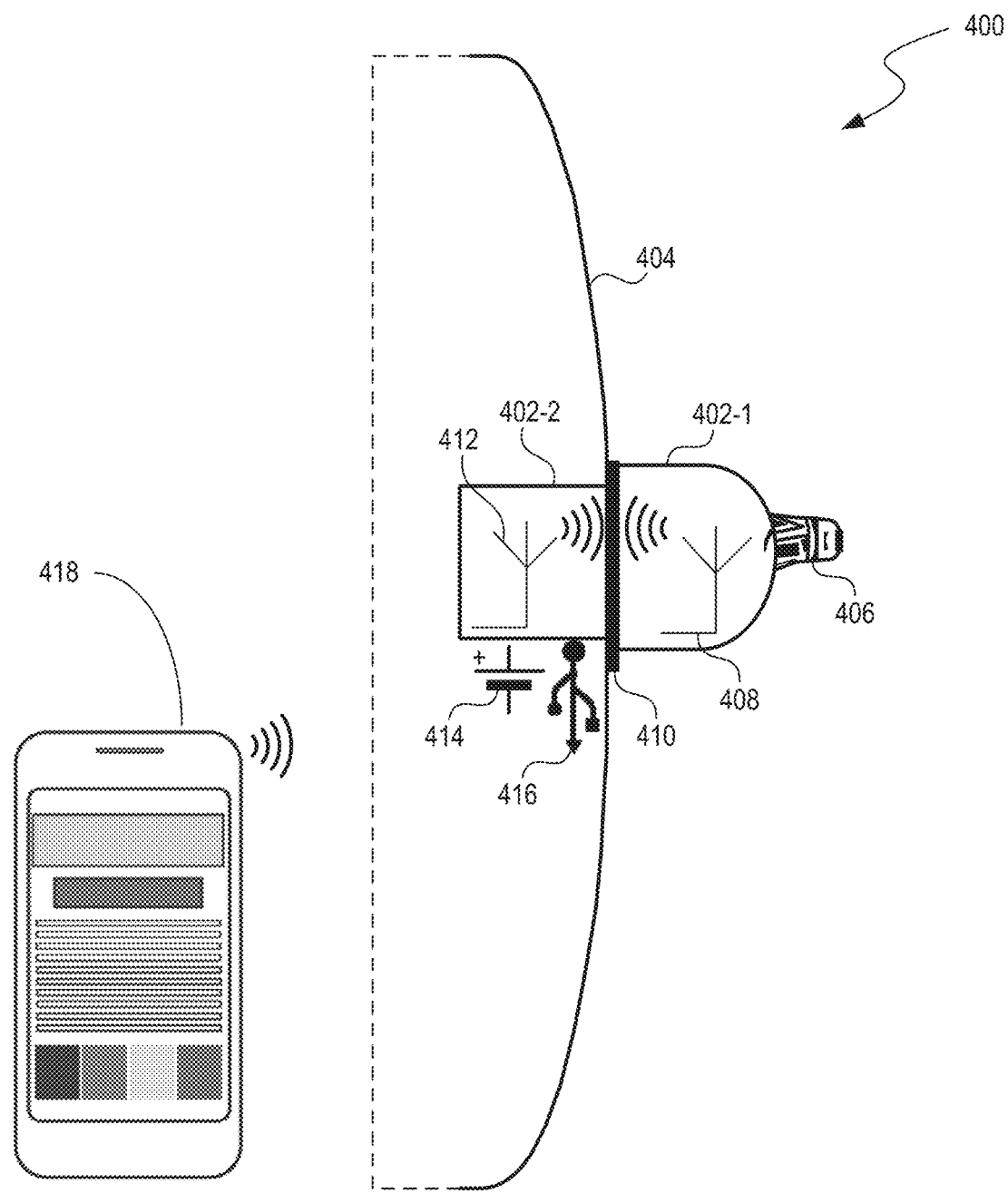
FIG. 4 illustrates a cutaway of the modular LIDAR device mounted to the windshield of the vehicle shown in FIG. 3.

FIG. 4 illustrates a cutaway of the modular LIDAR device of a LIDAR system mounted to the windshield of the vehicle shown in FIG. 3. The LIDAR system 400 has at least two components that collectively operate as the modular LIDAR device 402. The first component is a scanner component 402-1 that is mounted on an exterior surface of the windshield 404. The scanner component 402-1 is operable to scan a scene within its scanning range. The second component is a base component 402-2 that is mounted on an interior surface of the windshield 404. Accordingly, the scanner component 402-1 is structurally separate from the base component 402-2.

The scanner component 402-1 includes a laser and detector assembly 406, as well as a power and data communication mechanism 408. The laser and detector assembly 406 may include a light source operable to emit light toward an object in an environment relative to the vehicle, and a light detector operable to receive at least a portion of the light reflected off the object. This LIDAR data can be used by the LIDAR system to determine a distance to an object relative to the vehicle.

The power and data communication mechanism 408 enables the scanner component 402-1 to receive power and communicate control and data signals with the base component 402-2. In particular, it is necessary to supply power to the scanner component 402-1, to provide control signals to the scanner component 402-1, and to obtain data captured by the scanner component 21. The data communications mechanism of the scanner component 402-1 can receive power and control signals from, and send data to, the base component 402-2. For example, the power and data communication mechanisms 408 may include a communications transmitter operable to wirelessly transmit LIDAR data indicative of a distance to an object relative to the vehicle based on the light reflected off the object, and a power receiver operable to wirelessly receive power for the scanner component 402-1.

In some embodiments, the scanner component 402-1 can be affixed to the outer surface of the windshield 404. For example, a bonding agent 410 can be an adhesive that permanently bonds the scanner component 402-1 to the windshield 404. In another embodiment, the scanner component 402-1 can be removably affixed to the outer surface of the windshield 404. For example, the bonding agent 410 can be a two-sided tape. In this way, the laser and detector assembly 406 of the scanner component 402-1 has an unimpeded view of a terrain in front of the vehicle. That is, the windshield 404 does not interfere with the propagation and receipt of the LIDAR laser emitted by the laser and detector assembly 406, yet the scanner component 402-1 can be readily mounted to the vehicle's windshield 404. The bonding agent 410 is not limited to an adhesive or two-sided tape. Instead, those skilled in the art will appreciate that other types of bonding agents can affix the scanner component 402-1 to the windshield 404. Other examples of the bonding agent 410 include a vacuum or suction cup, magnets on either side of the windshield 404, or the like.

The base component 402-2 includes a power and communications mechanism 412 that can be coupled to a power source 414. For example, the base component 402-2 may include port to connect to a 12V accessory power port of the vehicle. In another example, the power and communications mechanism 412 may include an internal battery operable to supply power to the scanner component. For example, the base component 402-2 can include a power transmitter operable to wirelessly supply power to the scanner component 402-1. In some embodiments, the power transmitter is an inductive component of the base component 402-2, and the power receiver is an inductive component of the scanner component 402-1 such that the base component 402-2 is operable to supply power inductively through the windshield to the scanner component 402-1 when the base component 402-2 is located sufficiently proximate to the scanner component 402-1.

The base component 402-2 is also operable to exchange data directly with computing components of the vehicle in connection with enabling semi-autonomous or autonomous operation via a data port 416. For example, the power and communications mechanism 412 may include a communications receiver operable to wirelessly receive the LIDAR data transmitted by the scanner component 402-1, and a processor operable to process the received LIDAR data to enable semi-autonomous or autonomous navigation of the vehicle. The communication of information or data between the base component 402-2 and the scanner component 402-1 can be accomplished by any of several methods. In some embodiments, control signals and/or data are communicated between the base component 402-2 and the scanner component 402-1 via any of Wi-Fi, BLUETOOTH, LTE, NFC, inductive coupling, the use of KEYSSA KISS Connectivity, etc.

In some embodiments, the base component 402-2 is also affixed to the inner surface of the windshield, preferably proximate to the LIDAR scanner component 402-1, by such bonding agent (e.g., double-sided tape, vacuum or suction cups, magnets) similar to the bonding agent that removably or permanently affixes the scanner component 402-1 to the exterior surface of the windshield 404.

In some embodiments, the base component 402-2 is not solely a dedicated component of the modular LIDAR device 402. For example, the base component 402-2 may include a handheld mobile device (HMD) 418 (e.g., smartphone) operable to communicate data and control information with the LIDAR scanner component 402-1. The base component 402-2 could include a power supply that is separate from the HMD 418, and that is capable of supplying power to the LIDAR scanner component 402-1. In such embodiments, the HMD 418 or other data and control device is a communications sub-component of the base component 402-1 that need not be mounted to the windshield 404. Instead, this communications sub-component may be located anywhere, typically in the cabin of vehicle within communications range of the scanner component 402-1. In such cases, it is only necessary to transfer power directly to the scanner component 402-1 through the windshield 404. For example, the power can be supplied to the scanner component 402-1 via an inductive power transfer mechanism mounted proximate to the scanner component 402-1 on an opposite side of the windshield 404.

In this way, the scanner component 402-1 can be readily affixed to the vehicle without structurally modifying the vehicle in any way, and the LIDAR scanner component can be powered from a conventional 12V accessory power port typically found in most vehicles, even though the LIDAR scanner component is situated outside of the vehicle, such that the signal distortion that might otherwise be introduced by the windshield glass is entirely avoided.

Figure 5:
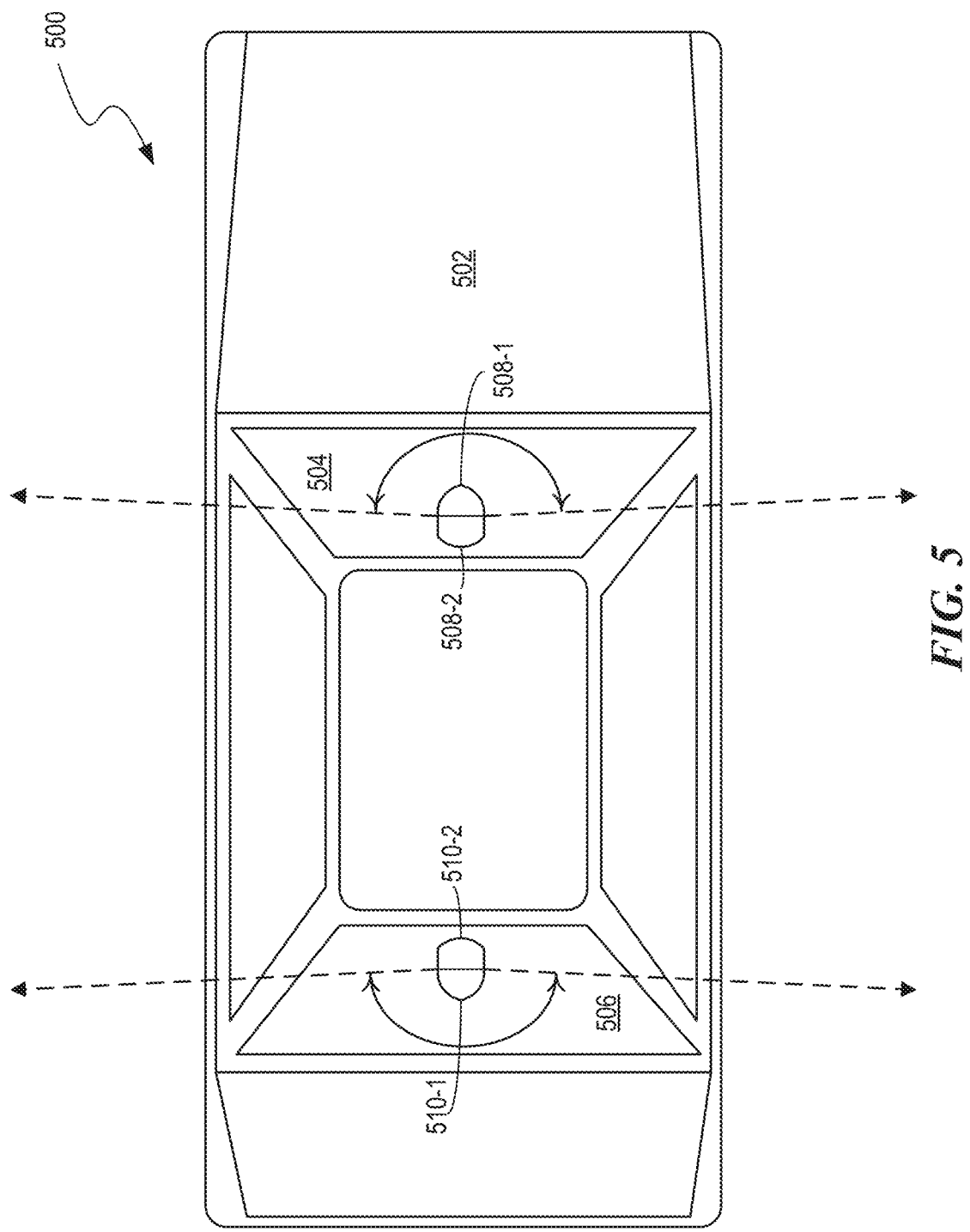
FIG. 5 illustrates a vehicular LIDAR system including an array of modular LIDAR devices that enable semi-autonomous or autonomous navigation of a vehicle.

FIG. 5 is a block diagram that illustrates an array of modular LIDAR devices of an semi-autonomous or autonomous navigation system. The vehicle 502 includes a front windshield 504 and the rear windshield 506 that each have an exterior surface on which a modular LIDAR device could be mounted. In particular, a modular LIDAR device 508 is mounted on the front windshield 504 in a front-facing direction. The modular LIDAR device 508 includes a scanner component 508-1 mounted on an exterior surface of the front windshield 504 and a base component 508-2 mounted on an interior surface of the front windshield 504. The modular LIDAR device 510 is mounted on the rear windshield 506 in a rear-facing direction. The modular LIDAR device 510 includes a scanner component 510-1 mounted on an exterior surface of the rear windshield 506 and a base component 510-2 mounted on an interior surface of the rear windshield 506.

Although only two modular LIDAR devices facing opposing directions are shown in FIG. 5, an array of modular LIDAR devices may be arranged to face any direction to enable a desired semi-autonomous or autonomous navigation. In some embodiments, a vehicle could have an array of modular LIDAR devices oriented in many different directions. The array of modular LIDAR devices can simultaneously collect data within their respective ranges of the same environment. The data collected by the array of modular LIDAR devices could be used to construct an array of images that are stitched together to construct an image that spans a broader range compared to any individual modular LIDAR device. For example, a first modular LIDAR device can be operable to scan a first range of the environment relative to the vehicle, and a second modular LIDAR device can be operable to scan a second range of the environment relative to the vehicle. In some embodiments, the first range faces a first direction relative to the vehicle and the second range of the environment faces a second direction opposite of the first direction. In some embodiments, a second modular LIDAR device is configured to increase a scanning range of the first modular LIDAR device.

In some embodiments, an array of modular LIDAR devices mounted to face different directions relative to the same vehicle can collectively form a 360-degree LIDAR system similar to a conventional roof-mountable LIDAR device. In this way, the array of mountable LIDAR devices could be used to enable a completely driverless vehicle system. As such, one or more mountable LIDAR devices could be mounted on vehicles to enable driver-assisted or driverless operations. This can be particularly advantageous in convertible vehicles that lack a roof to support a roof-mounted LIDAR device.

In some embodiments, the LIDAR system may include a central management component, which is any of base component of the array of modular LIDAR devices. The central management component can be configured to control each of the array of modular LIDAR devices to enable semi-autonomous or autonomous navigation of the vehicle. For example, the central management component can establish wireless communication links with each base component or scanner component of each of the array of modular LIDAR devices. As such, the central management component can manage operations of a LIDAR system of multiple modular LIDAR devices.

Figure 6:
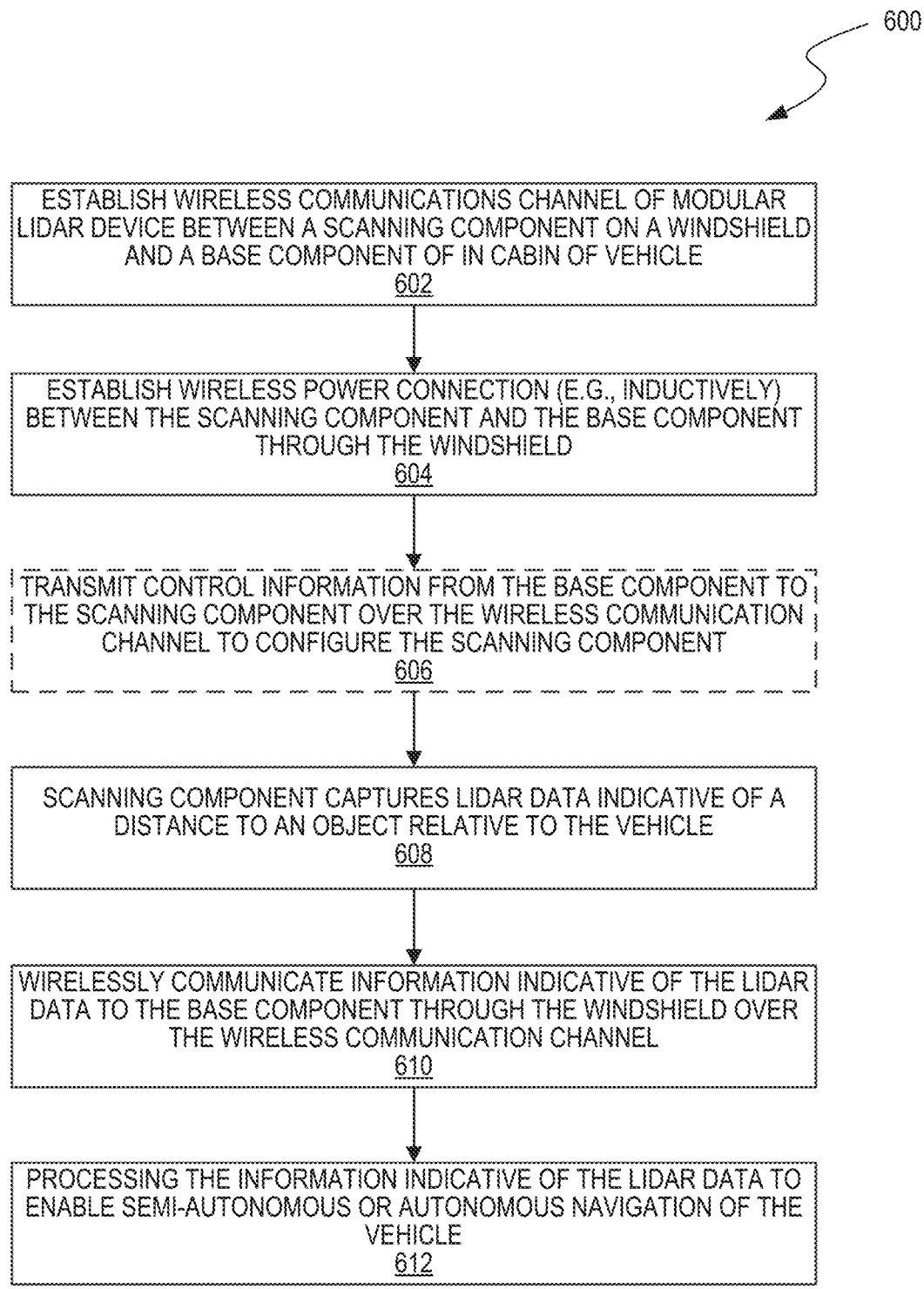
FIG. 6 is a flowchart illustrating a method performed by a modular LIDAR device to enable semi-autonomous or autonomous navigation of a vehicle.

FIG. 6 is a flowchart illustrating a method performed by a modular LIDAR device to enable semi-autonomous or autonomous navigation of a vehicle. In step 602, the modular LIDAR device can establish a wireless communication channel between a scanner component mounted on an external side of a windshield of a vehicle and a base component located in an interior cabin of the vehicle.

In step 604, the modular LIDAR device can establish a wireless power connection between the scanner component and the base component through the windshield. For example, the base component can supply power to the scanner component over the established wireless power connection by employing inductive coupling between the based component and the scanner component.

In step 606, the modular LIDAR device can optionally transmit control information from the base component to the scanner component over the wireless communication channel. The scanner component can be configured to capture the LIDAR data in accordance with the control information. For example, the base component can instruct the scanner component about where to scan and how to scan in a manner that resolves objects in the environment with sufficient resolution depending on the type of navigation features that are being supported by the LIDAR system In step 608, the modular LIDAR device can capture LIDAR data with the scanner component by emitting a light towards an object and detecting at least a portion of the light reflected off the object. The captured LIDAR data is indicative of a distance to the object relative to the vehicle. In particular, the modular LIDAR device can capture data of surrounding objects including their respective distances from the vehicle, as well as other data that could be used to determine the types of objects in the vehicle's surroundings.

In step 610, the modular LIDAR device wirelessly communicates information indicative of the LIDAR data from the scanner component to the base component through the windshield over the established wireless communication channel. For example, the LIDAR data could be communicated from the scanner component to the base component over a high data rate Wi-Fi connection (e.g., WiGig).

In step 612, the modular LIDAR device can process the information indicative of the LIDAR data to enable semi-autonomous or autonomous navigation the vehicle. For example, a LIDAR system that includes the modular LIDAR device can include software that aids in controlling the navigation of the vehicle. The software can use the LIDAR data to determine how to navigate the vehicle in real time, and instruct the navigation system of the vehicle as to how to navigate based on the obtained LIDAR data.

In some embodiments, a LIDAR system that includes the modular LIDAR device has, as part of its base component, a handheld mobile device (HMD) and a power subcomponent. The modular LIDAR system can establish the wireless communication channel between the HMD and the scanner component, and establish the wireless power connection between the power subcomponent mounted on an interior of the windshield and the scanner component. For example, the HMD can be a smartphone that receives user input causing the establishing of the wireless communication channel between the smartphone and the scanner component.

Figure 7:
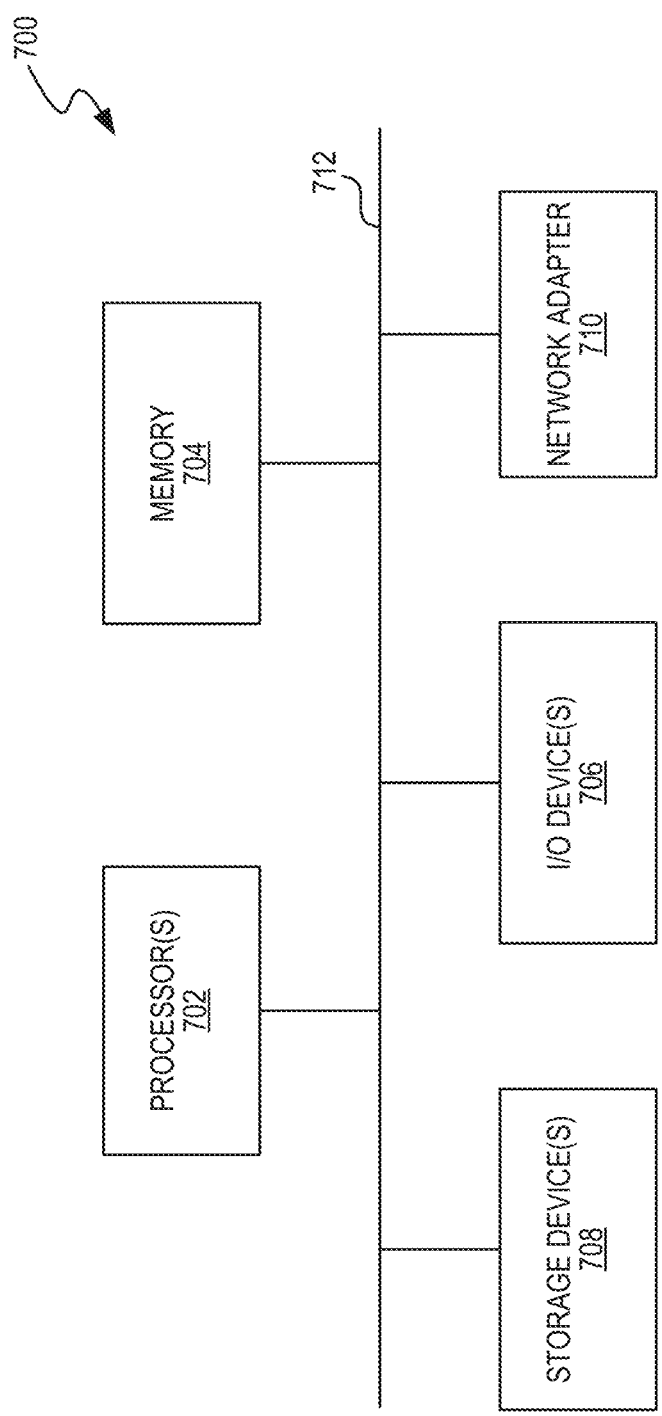
FIG. 7 is a block diagram illustrating a diagrammatic representation of a machine in the example form of a computer system operable to perform aspects of the disclosed technology.

FIG. 7 is a block diagram of a computer system that may be used to implement features of some of the disclosed technology. The computing system 700 may be a modular LIDAR device, a LIDAR system, a server computer, a client computer, a personal computer (PC), a user device, a tablet PC, a laptop computer, a personal digital assistant (PDA), a cellular telephone, an IPHONE, an IPAD, a BLACK- BERRY, a processor, a telephone, a web appliance, a network router, switch or bridge, a console, a handheld console, a (handheld) gaming device, a music player, any portable, mobile, handheld device, wearable device, or any machine capable of executing a set of instructions, sequential or otherwise, that specify actions to be taken by that machine.

The computing system 700 may include one or more central processing units ("processors") 702, memory 704, input/output devices 706 (e.g., keyboard and pointing devices, touch devices, display devices), storage devices 708 (e.g., disk drives), and network adapters 710 (e.g., network interfaces) that are each connected to an interconnect 712. The interconnect 712 is illustrated as an abstraction that represents any one or more separate physical buses, point to point connections, or both connected by appropriate bridges, adapters, or controllers. The interconnect 712, therefore, may include, for example, a system bus, a peripheral component interconnect (PCI) bus or PCI-Express bus, a Hyper-Transport or industry standard architecture (ISA) bus, a small computer system interface (SCSI) bus, a universal serial bus (USB), IIC (I2C) bus, or an Institute of Electrical and Electronics Engineers (IEEE) standard 1394 bus (i.e., FIREWIRE).

The memory 704 and storage devices 708 are computer-readable storage media that may store instructions that implement at least portions of the various embodiments. In addition, the data structures and message structures may be stored or transmitted via a data transmission medium (e.g., a signal on a communications link). Various communications links may be used (e.g., the Internet, a local area network, a wide area network, or a point-to-point dial-up connection). Thus, computer readable media can include computer readable storage media (e.g. non-transitory media) and computer readable transmission media.

The instructions stored in memory 704 can be implemented as software and/or firmware to program the processor 702 to carry out actions described above. In some embodiments, such software or firmware may be initially provided to the computing system 700 by downloading it from a remote system through the computing system 700 (e.g., via network adapter 710).

The various embodiments introduced herein can be implemented by, for example, programmable circuitry (e.g. one or more microprocessors, programmed with software and/or firmware), or entirely in special-purpose hardwired circuitry (i.e., non-programmable circuitry), or in a combination of such forms. Special-purpose hardwired circuitry may be in the form of, for example, one or more application-specific integrated circuits (ASICs), programmable logic devices (PLDs), field-programmable gate array (FPGAs), etc.

The above description and drawings are illustrative and are not to be construed as limiting. Numerous specific details are described to provide a thorough understanding of the disclosure. However, in certain instances, well-known details are not described in order to avoid obscuring the description. Further, various modifications may be made without deviating from the scope of the embodiments.

Reference herein to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. Certain terms that are used to describe the disclosure are discussed above, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any term discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given above. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

From the foregoing, it will be appreciated that specific embodiments of the invention have been described herein for purposes of illustration, but that various modifications may be made without deviating from the scope of the invention. Accordingly, the invention is not limited except as by the appended claims.

The invention claimed is:

1. A light detection and ranging (LIDAR) system comprising:
    a modular LIDAR device removably affixable to a vehicle windshield, the modular LIDAR device including:
        (i) a scanner component removably affixable to an external surface of the vehicle windshield, the scanner component including:
            a light source operable to emit light in a direction toward an object in an environment relative to the vehicle and away from the vehicle windshield;
            a light detector operable to receive at least a portion of the emitted light reflected off the object in the environment relative to the vehicle;
            a communications transmitter operable to wirelessly transmit LIDAR data through the vehicle windshield, the LIDAR data being indicative of a distance to the object relative to the scanner component based on the light reflected off the object;
            a power receiver operable to wirelessly obtain power for the scanner component; and a bonding agent operable to removably affix the scanner component to the external surface of the vehicle windshield; and (ii) a base component structurally separate from the scanner component and removably affixable to an interior surface of the vehicle windshield such that the base component couples to the scanner component through the vehicle windshield without physically contacting the scanner component, the base component including:

a power transmitter operable to inductively supply power for the power receiver of the scanner component such that the base component inductively couples to the scanner component through the vehicle windshield without physically contacting the scanner component;

a communications receiver operable to wirelessly receive the LIDAR data transmitted by the communications transmitter of the scanner component such that the base component communicatively couples to the scanner component through the vehicle windshield without physically contacting the scanner component; and a processor operable to process the LIDAR data received b the communications receiver through the vehicle windshield, wherein the output of the processor includes signals for controlling semi-autonomous or autonomous navigation functions of the vehicle.

2. The system of claim 1, wherein the bonding agent includes a double-sided tape.

3. The system of claim 1, wherein the bonding agent includes a suction cup, or a magnet.

4. The system of claim 1, wherein the bonding agent includes a magnet.

5. The system of claim 1, wherein the light source emits a pulsed laser light.

6. The system of claim 1, wherein the base component comprises:
a battery operable to supply power for the power receiver of the scanner component.

7. The system of claim 1, wherein the base component comprises:
a port operable to connect to a vehicular power source such that power inductively supplied for the power receiver of the scanner component is obtained from the vehicular power source and delivered via the base component.

8. The system of claim 1, wherein:
the power transmitter is an inductive component of the base component; and
the power receiver is an inductive component of the power receiver of the scanner component such that the base component is operable to supply power inductively for the power receiver of the scanner component when the base component is located sufficiently proximate to the power receiver of the scanner component.

9. The system of claim 1, wherein the bonding agent is a first bonding agent, the system further comprising:
a second bonding agent configured to permanently affix the at least a portion of the base component to the interior surface of the vehicle.

10. The system of claim 1, wherein the bonding agent is a first bonding agent, the system further comprising:
a second bonding agent configured to removably affix the at least a portion of the base component to the interior surface of the vehicle.

11. The system of claim 1, wherein the base component comprises:
a power subcomponent mountable to the interior surface of the vehicle windshield such that the base component can inductively supply power for the power receiver of the scanner component when the power subcomponent is mounted on a location on the interior surface that is sufficiently proximate to a location on the external surface on which the scanner component is mounted; and
a handheld mobile device configured to transmit control signals to the scanner component and receive the LIDAR data transmitted by the scanner component.

12. The system of claim 11, wherein the handheld mobile device is a smartphone running an application operable to receive user input causing the smartphone to generate the control signals in accordance with the user input.

13. The system of claim 1, wherein the scanner component is a first scanner component, the base component is a first base component, and the modular LIDAR device is a first modular LIDAR device, the system further comprising:
a second modular LIDAR device including a second scanner component and a second base component.

14. The system of claim 13, wherein the first modular LIDAR device is operable to scan a first range of the environment relative to the vehicle and the second modular LIDAR device is operable to scan a second range of the environment relative to the vehicle.

15. The system of claim 14, wherein the first range faces a first direction relative to the vehicle, and the second range faces a second direction opposite of the first direction.

16. The system of claim 13, wherein the second modular LIDAR device is configured to increase a scanning range of the first modular LIDAR device.

17. The system of claim 1, wherein the modular LIDAR device is a first modular LIDAR device, the system further comprising:
a plurality of modular LIDAR devices including the first modular LIDAR device collectively configured to enable semi-autonomous or autonomous navigation of the vehicle.

18. The system of claim 17 further comprising:
a central management component, which is any base component of the plurality of modular LIDAR devices, configured to control each of the plurality of modular LIDAR devices to enable semi-autonomous or autonomous navigation of the vehicle.

19. A light detection and ranging (LIDAR) system comprising:
a plurality of modular LIDAR devices affixable to a vehicle windshield, each modular LIDAR device including a scanner component affixable to an external surface of the vehicle windshield and operable to capture LIDAR data indicative of objects in a surrounding environment relative to the vehicle, and a base component operable to inductively supply power for the power receiver of the scanner component and wirelessly receive information indicative of the captured LIDAR data such that the base component couples to the scanner component through the vehicle windshield without physically contacting the scanner component; and
a central management component operable to control the plurality of modular LIDAR devices and process the information indicative of LIDAR data captured by the plurality of modular LIDAR devices to enable autonomous or semi-autonomous navigation of the vehicle.

20. The system of claim 19, wherein the central management component is any base component of the plurality of modular LIDAR devices.

21. A computer-implemented method comprising:
establishing a wireless communication channel of a modular light detection and ranging (LIDAR) device between a scanner component mounted on an external side of a vehicle windshield and a base component mounted on an interior surface of the vehicle windshield such that the base component communicatively couples to the scanner component through the vehicle windshield without physically contacting the scanner component;
establishing a wireless power connection between a power receiver of the scanner component and the base component through the vehicle windshield such that the base component couples to the scanner component through the vehicle windshield without physically contacting the scanner component;
capturing LIDAR data with the scanner component by emitting a light in a direction towards an object in an environment relative to the vehicle, and detecting at least a portion of the emitted light reflected off the object in the environment of the vehicle, the captured LIDAR data being indicative of a distance to the object relative to the scanner component;
wirelessly communicating information indicative of the LIDAR data from a communications transmitter of the scanner component to the base component through the vehicle windshield over the established wireless communication channel, such that the base component communicatively couples to the scanner component through the vehicle windshield without physically contacting the scanner component; and
processing the information indicative of the LIDAR data received by the communications receiver through the vehicle windshield, wherein the output includes signals for controlling semi-autonomous or autonomous navigation the vehicle.

22. The method of claim 21 further comprising:
supplying power from the base component for the power receiver of the scanner component over the established wireless power connection, which employs inductive coupling between the base component and the scanner component.

23. The method of claim 21 further comprising, prior to capturing the LIDAR data by the scanner component:
transmitting control information from the base component to the scanner component over the wireless communication channel; and
configuring the scanner component to capture the LIDAR data in accordance with the control information.

24. The method of claim 21, wherein the base component comprises a handheld mobile device and a power subcomponent, the method further comprising:
establishing the wireless communication channel between the handheld mobile device and the scanner component; and
establishing the wireless power connection between the power subcomponent mounted on an interior of the windshield and the scanner component.

25. The method of claim 24, wherein the handheld mobile device is a smartphone, the method further comprising:
receiving user input at the smartphone causing the establishing of the wireless communication channel between the smartphone and the scanner component.

\* \* \* \* \*